F. W. DEMBOIS.
Domestic Boiler.
No. 53,421.  Patented March 27, 1866.
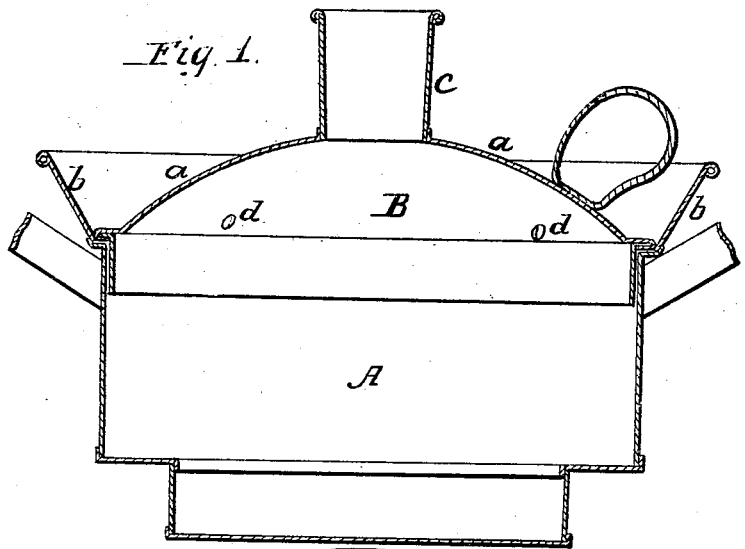
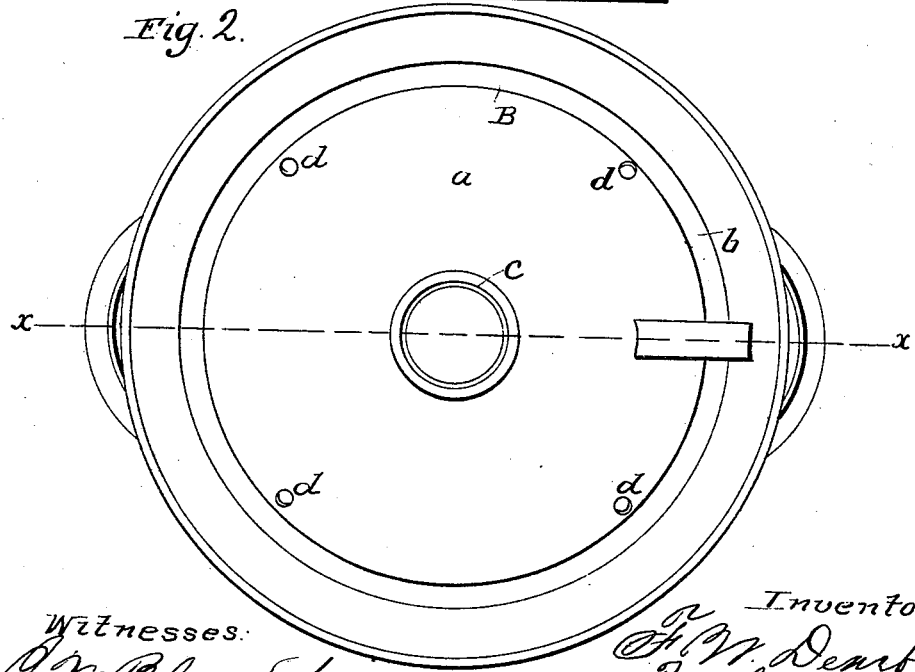

UNITED STATES PATENT OFFICE.

F. W. DEMBOIS, OF EAST SAGINAW, MICHIGAN.

BOILER FOR CULINARY PURPOSES.

Specification forming part of Letters Patent No. 53,421, dated March 27, 1866.

*To all whom it may concern:*

Be it known that I, F. W. DEMBOIS, of East Saginaw, Saginaw county, and State of Michigan, have invented a new and Improved Boiling-Vessel; and I do hereby declare that the following is a full, clear, and exact description thereof, which will enable others skilled in the art to make and use the same, reference being had to the accompanying drawings, forming part of this specification, in which—

Figure 1 is a vertical central section of my invention, taken on the plane of the line $x\ x$, Fig. 2. Fig. 2 is a plan or top view of the same.

Similar letters of reference indicate like parts.

The object of my invention is to produce a vessel for boiling water, sirups, and fluids of all kinds which will prevent the fluids, after they have reached a certain degree of heat, "boiling over," as it is called.

My invention consists in the combination, with any suitably-shaped vessel in which fluids may be heated, of a cover or lid constructed with a convex upper surface and a rim all around having holes or perforations at its lowest point, and provided with a tube or chimney at its center, which opens into the vessel.

A designates a metallic vessel, which may be of any shape or kind capable of containing fluid to be subjected while therein to the operation of boiling.

As before stated, my invention consists in the combination, with such vessel, of a cover or lid of peculiar construction. The said cover is of a size to fit closely upon the said vessel, so that the steam cannot escape between it and the sides of the vessel. The cover, as a whole, is designated by the letter B, and it consists in detail of a convex upper surface, $a$, around the edge of which there is secured a deep rim, $b$, and arising from the center of the same is a pipe, $c$, opening into the vessel A, and also open at its top. Holes or punctures $d$ are made through the cover at its lowest point—that is to say, near the rim $b$—which open into the vessel A.

When the fluid in the vessel has reached such a point of heat that it would in ordinary vessels boil over, the boiling fluid will rise up through the pipe $c$ and flow over upon the convex cover $a$, where it will be cooled and run back into the vessel through the holes $d$ made therein for the purpose.

This is a very simple apparatus and will save a great deal of trouble and vexation occasioned by continually watching any boiling liquid lest it boil over, as would certainly occur if it be allowed to reach a certain degree of heat.

What I claim as new, and desire to secure by Letters Patent, is—

The combination, with any vessel suitable for containing liquid to be boiled, of a cover, B, consisting of the parts substantially as herein described.

F. W. DEMBOIS.

Witnesses:
 A. W. NEWTON,
 I. M. SMITH.